Feb. 20, 1968 T. G. ALLDERDICE 3,369,556

WATER SYSTEM FREEZE PROTECTION VALVE

Filed Jan. 13, 1965

INVENTOR.
THOMAS G. ALLDERDICE
BY
*Baldwin & Martin*
ATTORNEYS

3,369,556
WATER SYSTEM FREEZE PROTECTION VALVE
Thomas G. Allderdice, 12816 Aladdin Road, Mandarin, Fla. 32064
Filed Jan. 13, 1965, Ser. No. 425,127
16 Claims. (Cl. 137—62)

ABSTRACT OF THE DISCLOSURE

A freeze protection valve for use in a water supply system having a bellows substantiall filled with an aqueous liquid which, when frozen, expands the bellows thereby opening the valve member to permit water to flow from the supply. A lost motion driving connection is operatively associated with the bellows and valve member to prevent opening of the valve member during expansion of the bellows due to heating of the aqueous liquid at normal atmospheric temperatures.

---

This invention pertains to water systems and, more particularly to the preventing of damage to water systems from freezing of water in the pipes. The invention further relates to a valve assembly automatically responsive to temperature at or near the freezing point of water.

A general object of the invention is to provide improved protection against freezing, and consequent bursting of pipes, in water systems. The invention finds particular applicability to residence water systems in the Southern part of the United States or where temperatures below about 30 degrees F. occur infrequently and where sub-zero temperatures substantially never occur. In cold climates, the more expensive burying of pipes for protection against freezing is usually justified.

A particular object of the invention is to provide an improved automatically operable valve which will open in response to drop in atmospheric temperature to near the freezing point of water.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figure 1:
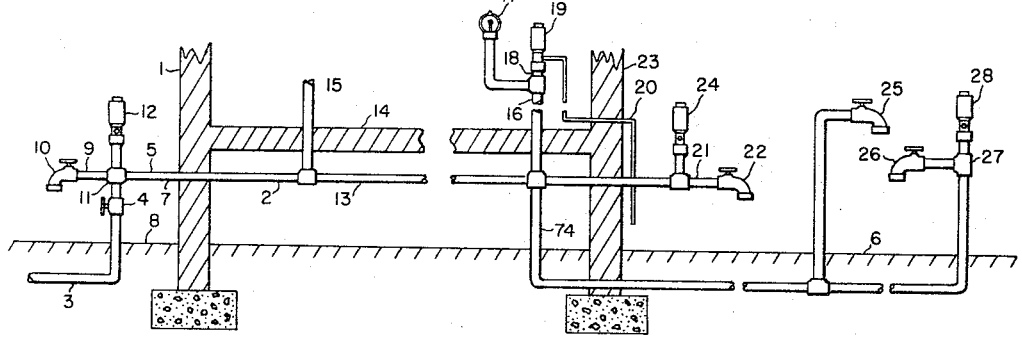
FIG. 1 is a schematic view of a water system for a building and grounds protected in accord with the invention.

As seen in FIG. 1, the house 1 is provided with water by means of a system 2 which includes an incoming supply main 3 which constitutes a part of a suitable source of water under pressure. It may, typically, be a part of a municipal water system.

Main 3 connects through a main valve 4 to the house main 5, which is the incoming main of the distribution system for house 1 and its grounds 6. The house main includes, typically, in houses in the Southern United States, for example, a portion 7 which is above ground 8 and outside of the house and which extends from the exposed main valve 4 into the house above ground. While the portion 7 typically includes a T to provide a branch 9 to an outside sill cock or hose cock 10, according to the invention, an X or double T 11 is arranged in pipe 7 to provide not only for connection of cock 10 but also for connection of normally closed freeze-responsive leak valve means 12. The valve means are arranged in an exposed position outside of the house and adjacent the main valve 4 or portion 7 of the house main, whereby the valve means assumes approximately the same temperature as the valve 4 or the portion 7 of the house main, and preferably the valve means is arranged in a position at least as exposed to cooling atmosphere as the most exposed parts of portion 7 or valve 4.

The freeze responsive valve 12 communicates with house main 5. While the valve 12 may be so connected that when open, it leaks water slowly from the portion 13 of house main 5 which is within the house, such as below the ground floor 14 thereof, it is usually more convenient to connect it to portion 7 by means such as the double T 11 as shown. When the valve means 12 reaches a temperature slightly less than 32 degrees F., it opens automatically and drips or slowly passes water from main 5. When it is above 32 degrees F., the valve 12 is closed.

There may be one or more branches, such as branch 15, from the house main portion 13 to the bathrooms, kitchen, or the like. There may also be a branch as at 16 terminating within the house 1 in an automatic fire sprinkler head 17. If such sprinkler head is in an exposed position, as it may be in the open attic of an unheated house or an unheated building used other than as a dwelling, and if the branch 16 might freeze adjacent the terminal sprinkler 17 before valve assembly 12 had reached freezing temperature when the atmosphere is becoming colder, then, according to the invention, a branch 18 is provided from branch 16 and connects to a valve assembly 19, which may be identical to valve assembly 12, or, as shown, may be identical except for the attachment thereto of a small drain tube 20 which is disposed to carry water leaking through valve 19 to a point outside of the house whereby the leaking water from the valve 19 merely drips or flows slowly onto the ground 8.

The house main may include an extension or branch 21 terminating in a sill cock or hose cock 22 at the side 23 of the house 1 opposite to that side at which sill cock 10 is arranged. The branch 21 immediately adjacent cock 22 is preferably provided with a temperature responsive leak valve 24. The inclusion of valve 24 becomes important if the portion 21 of the house main 5 is more exposed than the portion 7 thereof. In the system shown, however, an additional branch portion 74 is connected to the house main and this extends underground to supply outdoor hose cocks 25 and 26, useful for watering grounds 6. The branch 74 is shown as having a terminal end portion 27 at cock 26 and this terminal end portion is provided with a temperature sensitive leak valve 28.

It is of primary importance to provide a freeze responsive leak valve at a position which will prevent any part of the house system from freezing when such part is isolated. Thus, if freezing occurs at portion 7 adjacent main valve 4, the whole system therebeyond is isolated unless some valve, such as valve 24 or valve 28, opens. So long as water can pass back into main 3 from the house system, freezing at a terminal such as terminal 27 would not cause bursting pressures. The provision of a freeze-responsive valve 12 adjacent main valve 4 which opens to relieve pressure in the house main 5 before portion 7 can freeze is, accordingly, of primary importance, because, normally, the provision of the freeze-responsive valve 12 at this location will keep main valve 4 open and will also relieve pressure in house main 5 whereby any freezing further along the house system, such as at 21 or 27, will not create bursting pressure but such pressures would be relieved through the leaking valve 12.

If portion 74 of the house main is exposed and likely to freeze before a terminal such as at 25 or 27, then a valve 24 at such exposed intermediate portion should be provided to prevent bursting pressures in the system between portion 74 and terminal 27 as freezing continues. If terminal 27 is more exposed than portion 74 and is likely to freeze before portion 74, then terminal portion 27 should be provided with a valve 28. Leakage provided by freezing and opening of valve 28 will reduce the tendency of intermediate portions, such as portion 74, to freeze because of the flow therethrough to the leaking valve 28.

It may be stated as a rule, therefore, that a freeze-responsive valve should be placed adjacent the exposed portion of the house main closest to the main valve and connected to provide leakage from the house main in response to freezing conditions and, if there is an exposed intermediate portion of the system between the aforementioned portion closest to the main valve and a terminal, an additional freeze-responsive valve should be provided to protect each such intermediate portion and should be located either adjacent the downstream end of the intermediate portion or at the most exposed corresponding terminal.

Thus, in the system shown in FIG. 1, a freeze-responsive valve 12 is provided at or adjacent the exposed portion 7 of the house main closest to the main valve 4. If the intermediate portion 74 is exposed to freezing, a freeze-responsive valve should be provided at the more exposed one of terminals 25 or 27. Thus valve 28 is provided in the disclosed system upon the assumption that terminal 27 is more exposed and more likely to freeze than either terminal 25 or intermediate portion 74. If intermediate portion 13 of the house main is exposed to freezing, then, in the system shown, a freeze responsive valve may be required at terminal 18, as shown at 19, or at terminal 21, as shown at 24, depending upon which of these terminals is more exposed, it being assumed that portion 13 is less exposed than at least one of the terminals 18 and 21.

In any system in which a portion of the house main adjacent the main valve is susceptible of freezing, such portion should be provided with a freeze-responsive valve which will protect against freezing of any downstream part of the system which is not isolated therefrom by a intermediate portion of the system. Thus the valve 12 would protect against freezing at terminal portion 27, for example, unless terminal portion 27 had become isolated from portion 7 by freezing at, for example, intermediate portion 74.

A valve located as shown at 24 may provide good protection for the intermediate portion 74 of the house main and, if valve 24 is more exposed than portion 74, valve 24 can serve as the protective valve for the intermediate portion 74 which prevents freezing of this portion and which, therefore, prevents isolation of the part of the system between portion 74 and terminal portion 27.

Figure 2:
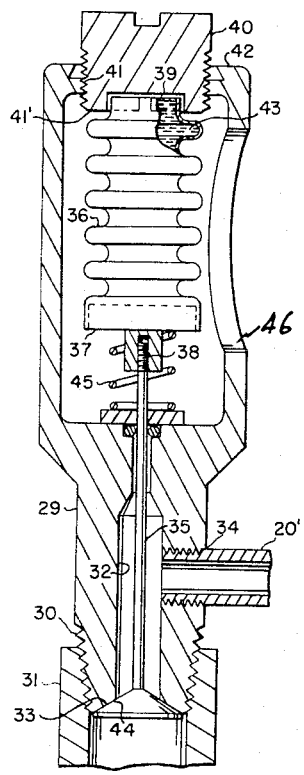
FIG. 2 is a valve assembly in accord with the invention.

FIG. 2 shows a valve 12 which is useful in the system of FIG. 1 at the position indicated for valve 12 therein and for each of the valves 19, 24 and 28. The valve 12 as seen in FIG. 2 comprises a body member 29, which may be of brass, bronze or other suitable material, having a pipe threaded lower end portion 30 for attachment into the pipe system (represented by a fragment of a connecting nipple 31) the body being bored to provide a hollow conduit 32 closed at one end by a valve element 33. The conduit opens above nipple 31 at a side opening 34, which may be provided with a drain tube 20' as shown. When the valve is open, water drains from nipple 31, and thus from the pipe connected therethrough, into the conduit and out through outlet opening 34 to drain freely into the atmosphere, or onto the ground or otherwise to waste.

The valve element 33 is operated by a stem 35 which is connected to an expansible chamber device in the form of a bellows 36. The bellows, which is best formed of bronze, comprises an end element 37 connected to stem 35, such as by threads 38, and the opposite end 39 of the bellows is engageable with an adjustable abutment portion 40 of the body 29. The portion 40 is seen to be in the form of a threaded stud and is engaged in a bore 41 in the upper end 42 of the body. The bellows 36 is filled with an aqueous liquid or water as seen at 43. When stud 40 is properly adjusted, a small space exists between the upper end 39 of the bellows and the stud 40, when the temperature of the water 43 is above freezing and with the valve element seated against the seat 44 which defines the entrance to conduit 32. As the water 43 varies in temperature with atmospheric temperature changes between freezing temperature and hot summer temperatures, the water expands and contracts slightly, moving end 39 toward and away from stud 40 without exerting force to open the valve. The bellows thus has lost motion in its operative connection with the valve. The valve is biased by spring 45 engaged between end element 37 and the body 29 into closed position. The body 29 preferably comprises a side opening 46 to expose bellows 36 to the atmosphere.

When the temperature of the atmosphere drops below freezing, the water 43 freezes to form ice having a volume greater than the volume of the water as a liquid. Freezing of the water 43 elongates the bellows and forces end element 37 to move against the bias of spring 45 and to force valve element 33 away from seat 44. The opening between the valve element 33 and seat 44, and the diameter of conduit 32 are sufficient, when the valve is open, to permit water to drain through the valve and out through opening 34 at a fast drip rate, or at a slow flow rate up to a few gallons per hour, such as from about 5 to about 10 gallons per hour. The rate may be limited by the size of the conduit 32 or of opening 34 or of tube 20'. Alternatively, the rate may be limited by the extent of displacement of valve element 33 from its seat when the water 43 freezes and this displacement may be adjusted by adjustment of stud 40.

In order to retain the bellows in alignment, a flange 41' depends from stud 40 loosely around the upper end portion 39 of the bellows.

Figure 3:
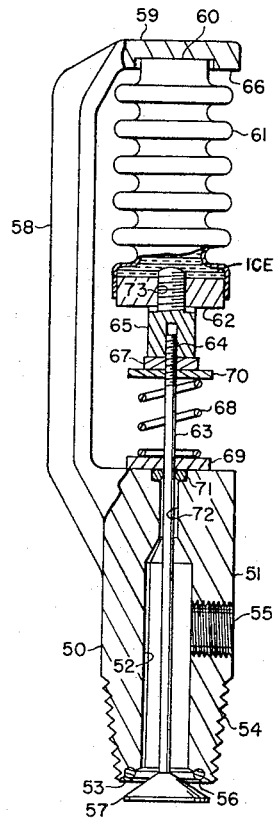
FIG. 3 is a second embodiment of a valve assembly in accord with the invention.

An alternative valve construction is shown in FIG. 3, wherein the leak valve 50, which is likewise adapted for use at 12, 19, 24 and 28 in the system of FIG. 1, comprises a body 51 with a bore forming a conduit 52 arranged to communicate with the system through valve seat 53. The body is provided with pipe threads 54 for connecting to the system. A drain opening 55 in body 51 conducts water in conduit 52 to waste. Seat 53 in this embodiment is provided with an annular resilient sealing ring 56 engaged by valve element 57 in closed position.

The body 51 includes a rigid leg 58 terminating in an upper cap or abutment portion 59 against which the upper end 60 of expansible chamber device or bellows 61 may bear while the lower end portion 62 is applying valve-opening force to a stem 63 for valve element 57. As in the FIG. 2 construction, the device is adjusted to provide lost motion in the bellows system to permit free expansion and contraction of the water contained in the bellows in each construction while the water remains liquid and as temperature changes. While such adjustment is provided by the inclusion of the threaded abutment stud 40 in FIG. 2, the adjustment in the FIG. 3 construction is provided by the threaded connection 64 between the valve stem and a connection boss 65 attached rigidly to the lower end portion 62 of the bellows. The valve stem is screwed in and out of boss 65 until, with the valve element seated, a small lost motion space exists between the abutment 59 and the upper end 60 of the bellows at atmospheric temperatures above freezing. A depending flange portion 66 of cap 59 loosely cages the upper end portion of the bellows, in the manner of flange portion 41' of FIG. 2, to retain the bellows in position. A jam nut 67 threaded on the stem 63 is turned up tight against boss 65.

The valve in FIG. 3 is shown in its open, leaking condition, which condition exists when the water which fills bellows 61 is frozen. In this condition, the lost motion is taken up and end portion 60 is engaged with the cap 59. Spring 68, which biases the valve toward closed position, is, of course, somewhat compressed when the bellows has force the valve open. Washers 69 and 70 may be provided as shown to form seats for the compression spring 68. A small O-ring gasket 71 may be arranged around the valve stem 63 to restrict the passage of water along stem 63 through bore 72 when the valve is open, and to reduce the chance of foreign matter such as sand grains falling into the conduit 52 where they might lodge in a position which interferes with valve operation.

It will be apparent that opening 55 of the FIG. 3 construction may be provided with a drain tube such as shown at 20' in FIG. 2 if desired, and that the valve seat in each embodiment may or may not be provided with a soft or resilient sealing ring as shown at 56 in FIG. 3.

Depending upon the relative exposure to atmospheric temperature, and the relative rate at which the pipe adjacent the valve assembly and the valve bellows loses heat with falling atmospheric temperature, it may be desirable to fill the bellows with an aqueous liquid comprising water with a small amount of some other substance dissolved therein, whereby the freezing point of the liquid in the bellows may be adjusted to, for example, 31.5 degrees or 31.0 degrees or even to 28 degrees. Automobile radiator additive antifreeze materials, glycerine, alcohol, various salts and the like may, for example, be so used. Alternatively, or additionally, the bellows may be painted flat black, or provided with a silvery surface to increase or retard the loss of heat from the bellows when the atmospheric temperature falls.

While compresion springs 45 and 68 are desirable to retain the valves closed until forced open by the bellows, these springs are not essential if the water pressure against the valve elements 33 and 57 is to be counted upon to maintain the valve in closed position. Without the spring, however, the valve might open if the water system was turned off by main valve 4 or if pressure were lost for some other reason, and upon restoration of pressure in the system, there mgiht be substantial leakage before the pressure closed the valve. Furthermore, without spring 68, if pressure was lost, the valve 57 and bellows 61 might drop sufficiently to permit bellows end 60 to drop below flange 66 and to then be out of line. Upon reestablishment of pressure, top 60 might then engage flange 66 and prevent reseating of the valve. Thus the spring 68 or 45 serves the function of retaining the upper end of the bellows in position within the caging flange 66 or 41' in each of the disclosed embodiments, in addition to its function in each case of biasing the valve into closed position.

The bellows 61 is seen to have an opening 73 through its lower end portion 62 into which boss 65 is threaded. The bellows is conveniently originally filled with water through this opening prior to assembly in the finished structure, boss 65 being then threaded tightly in position to close opening 73.

In each of the embodiments according to FIG. 2 and FIG. 3, it will be seen that the bellows is disposed between the valve stem and a part of the body which is is fixed with respect to the valve seat, the stud 40 or cap 59, and that a lost motion space is provided at one end of the bellows at atmospheric temperatures above freezing, which space permits slight expansion of the bellows before the bellows can exert force to push the valve stem away from the said fixed portion of the body. This lost motion space is lost or fixed as the first freezing expansion of the bellows occurs, and as the water in the bellows freezes further, the valve-opening action of the bellows takes place. Upon thawing of the water in the bellows, the valve, of course, returns to closed condition and the lost motion space is again established. The lost motion space between the cap portion and the bellows permits free expansion of the bellows as the water therein expands slightly upon increases in temperature of the water from 33 degrees F. to 100 degrees or 110 degrees F. or to any higher atmospheric temperature. It will be recognized that the expansion of the water due to temperature increase is very small when compared to the expansion produced by freezing.

While only certain preferred embodiments of this invention have been shown and described by way of illustration, many modifications will occur to those skilled in the art and it is, therefore, desired that it be understood thaat it is intended in the appended claims to cover all such modifications as fall within the true spirit and scope of this invention.

What is claimed as new and what it is desired to secure by Letters Patent of the United States is:

1. In a water supply system for a building, a main supply pipe including a portion entering the building and disposed above ground, a normally closed valve having an inlet connected to said supply pipe and having an outlet at atmospheric pressure, said valve being adapted when opened to pass a relatively small amount of water at the normal pressure in said supply pipe, and means for opening the valve prior to substantial freezing of the water in said portion of the supply pipe including a bellows substantially filled with an aqueous liquid and located externally of the building and closely adjacent said portion of the supply pipe.

2. In a water supply system, a portion of said system being more susceptible to freezing of the water therein than other portions of said system, a normally closed valve having an inlet connected to said portion of the system and having an outlet, said valve being adapted when open to pass to drain a relatively small amount of water at the normal pressure in said system, and means for opening said valve prior to freezing of the water in the said portion of the system including a bellows substantially filled with an aqueous liquid, said bellows being directly exposed to the ambient conditions of said portion of the system and being located closely adjacent said portion of the system.

3. In a water supply system, an intermediate portion of said system being more susceptible to freezing of the water therein than other portions of said system, a normally closed valve having an inlet connected to said intermediate portion of the system adjacent the downstream end of said intermediate portion and having an outlet, said valve being adapted when open to pass to drain a relatively small amount of water at the normal pressure in said system, and means for opening said valve prior to freezing of the water in the said intermediate portion of the system including a bellows substantially filled with an aqueous liquid, said bellows being directly exposed to the ambient conditions of said intermediate portion of the system and being located closely adjacent said intermediate portion of the system.

4. In a water supply system for a building, said system having an inlet portion entering the building and disposed above ground and having a second portion downstream of said inlet portion and which is susceptible to freezing of the water therein, a pair of normally closed valves having inlets respectively connected to said inlet portion and to said second portion, said valves having outlets at atmospheric pressure and being adapted when opened to pass a relatively small amount of water at the normal pressure in said system, and means for opening the valves prior to freezing of the water in the respectively associated portions of the system including a bellows respectively associated with each valve, each bellows containing an aqueous liquid and being directly exposed to the ambient conditions of the respectively associated portion of the system, the bellows associated with said inlet portion being located externally of the building closely adjacent said inlet portion, the bellows associated with said second portion being located closely adjacent the point in said second portion at which freezing of the water therein is most likely first to occur.

5. A freeze protection valve for a water supply system comprising a valve body having a seat, a valve member engaged with said seat, an expansible chamber containing an aqueous liquid, and means including said expansible chamber for moving said valve member away from said seat in response to freezing of said liquid, said means being ineffective to move said valve member during heating thereof at normal high atmospheric temperatures.

6. A freeze protection valve for a water supply system comprising a valve body having a seat, a valve member engaged with said seat, means for moving said valve member away from said seal including an expansible chamber containing an aqueous liquid, means for drivingly connecting said expansible chamber to said valve member to move said valve member away from said seat in response to expansion of said chamber due to freezing of said liquid, and means for rendering the last mentioned means ineffective to move said valve member in response to expansion of said chamber due to heating of said liquid at normal high atmospheric temperatures.

7. A freeze protection valve for a water supply system comprising a valve body having a seat, a valve member engaged with said seat, an expansible chamber containing an aqueous liquid, and lost motion means for providing a driving connection between said chamber and said valve member to move said valve member away from said seat on expansion of said chamber due to freezing of the liquid therein.

8. A freeze protection valve for a water supply system comprising a valve body having a seat, a valve member engaged with said seat, an expansible chamber containing an aqueous liquid, and means including means fixed relative to said body for driving said valve member with said expansible chamber in a direction to open the valve in response to freezing of said liquid and including lost motion means for preventing opening of said valve during expansion of said chamber due to heating of the liquid therein at normal high atmospheric temperatures.

9. A freeze protection valve for a water supply system comprising a valve body having a seat, a valve member engaged with said set, a bellows containing an aqueous liquid, means providing a shoulder fixed relative to said body for engagement with one end of said bellows, means fixing one end of said bellows relative to one of said shoulder and valve member, the other end of said bellows being spaced out of driving relationship with the other of said valve member and shoulder a predetermined distance to prevent opening of the valve in response to expansion of said liquid during heating thereof at normal high atmospheric temperatures.

10. A freeze protection valve for a water supply system comprising a valve body having a seat, a valve member engaged with said seat, a bellows containing an aqueous liquid means drivingly connecting one end of said bellows to said valve stem, and means providing an adjustable abutment for the other end of said bellows, said abutment being spaced from said other end of the bellows a predetermined distance to permit a predetermined amount of expansion of the bellows without opening of the valve.

11. A freeze protection valve for a water supply system comprising a valve body having a seat, a valve member engaged with said seat, a bellows containing an aqueous liquid, said bellows being exposed directly to ambient conditions of the valve, means providing a driving connection between one end of said bellows and said valve member, means providing an abutment normally fixed relative to said valve body, said abutment being spaced from the other end of said bellows in alignment therewith and being engageable therewith in response to expansion of the bellows due to freezing of said liquid, and means for adjusting the length of said driving connection thereby to vary the spacing of said other end of the bellows from said abutment.

12. A freeze protection valve for a water supply system comprising a valve body having an inlet and an outlet and a valve seat between said inlet and outlet, a valve member engageable with said seat and moveable in the direction of flow through the valve into engagement with said seat to close said valve, a valve stem connected at one end to said valve member for movement therewith, a metallic bellows fabricated of a material having a high thermal conductivity, said bellows being at least substantially filled with an aqueous liquid and being aligned with said valve stem, means connecting one end of said bellows to said valve stem for movement therewith, said bellows being directly exposed to ambient conditions of said valve, means lightly biasing said valve member toward said seat, and means providing an abutment normally fixed relative to said valve body and extending across the other end of said bellows in axially spaced relation thereto.

13. A freeze protection valve for a water supply system comprising a valve body having an inlet and an outlet and a valve seat between said inlet and outlet, a valve member engageable with said seat and moveable in the direction of flow through the valve into engagement with said seat to close said valve, a valve stem connected at one end of said valve member, a metallic bellows at least substantially filled with an aqueous liquid and aligned with said valve stem, means connecting one end of said bellows to said valve stem for movement therewith, said bellows being directly exposed to ambient conditions of said valve, an adjustable member threadedly supported on said body for movement generally axially of the bellows, said adjustable member having a recess receiving the other end of the bellows and including a side wall surrounding said other end of bellows and a bottom providing an abutment for said other end of the bellows, said other end of the bellows being spaced from said bottom of said recess, and means providing a feeler gauge receivable opening in the side wall of said recess communicating with the space between said other end of the bellows and the bottom of said recess.

14. In a water supply system having a portion susceptible to freezing of the water therein, a leak valve including an inlet connected to said system so as to effect a flow of water through said portion in response to opening of said valve, said valve having a relatively small capacity so as when open to pass a relatively small amount of water at the nominal pressure in said portion, and means for opening said valve prior to substantial freezing of the water in said portion including and expansible chamber containing an aqueous liquid and exposed to the ambient conditions of said portion.

15. In a water supply system having a portion susceptible to freezing of the water therein, a leak valve including a valve body having a valve seat and having an inlet connected to said system so as to effect a continuous flow of water through said portion in response to opening of said valve, a valve member normally engaged with said seat to close the valve, and means for driving said valve member in a direction to open said valve prior to substantial freezing of the water in said portion including an expansible chamber containing an aqueous liquid and exposed to ambiet conditions of said portion.

16. A freeze responsive leak valve comprising a valve body having a single valve seat, a valve member normally engaged with said seat, and means for moving said valve member away from said seat in response to exposure of the valve to freezing conditions including an expansible chamber containing an aqueous liquid.

References Cited
UNITED STATES PATENTS

| | | | |
|---|---|---|---|
| 306,352 | 10/1884 | Prentiss | 137—79 X |
| 467,634 | 1/1892 | Brigham | 236—56 |
| 1,200,928 | 10/1916 | Egan | 137—62 |
| 1,532,214 | 4/1925 | Wishart | 137—62 X |
| 1,554,344 | 9/1925 | Haapanen | 137—62 |
| 1,558,276 | 10/1925 | Peterson | 137—62 |
| 2,523,371 | 9/1950 | Jennings | 251—11 X |
| 2,822,693 | 2/1958 | Mulsow | 137—62 X |
| 3,211,414 | 10/1956 | Webb | 251—11 |

FOREIGN PATENTS

| | | |
|---|---|---|
| 604,307 | 1/1926 | France. |
| 669,978 | 10/1929 | France. |

CLARENCE R. GORDON, *Primary Examiner.*

UNITED STATES PATENT OFFICE
CERTIFICATE OF CORRECTION

Patent No. 3,369,556                      February 20, 1968

Thomas G. Allderdice

It is hereby certified that error appears in the above numbered patent requiring correction and that the said Letters Patent should read as corrected below.

Column 1, line 12, for "substantiall" read -- substantially --; column 3, line 58, after "a" insert -- frozen --; column 6, line 3, after "which" strike out "is"; column 7, line 30, for "seal" read -- seat --; line 59, for "set" read -- seat --; column 8, line 65, for "and" read -- an --.

Signed and sealed this 27th day of May 1969.

(SEAL)
Attest:

Edward M. Fletcher, Jr.
Attesting Officer

Commissioner of Patents